(12) United States Patent  
Hayasaka et al.

(10) Patent No.: US 11,980,985 B2  
(45) Date of Patent: May 14, 2024

(54) PROCESSING DEVICE AND CUT-PROCESSING METHOD

(71) Applicants: NATIONAL UNIVERSITY CORPORATION TOKAI NATIONAL HIGHER EDUCATION AND RESEARCH SYSTEM, Nagoya (JP); DENSO DAISHIN CORPORATION, Tokoname (JP); DENSO CORPORATION, Kariya (JP)

(72) Inventors: Takehiro Hayasaka, Nagoya (JP); Eiji Shamoto, Nagoya (JP); Soohyun Nam, Nagoya (JP)

(73) Assignees: NATIONAL UNIVERSITY CORPORATION TOKAI NATIONAL HIGHER EDUCATION AND RESEARCH SYSTEM, Nagoya (JP); DENSO DAISHIN CORPORATION, Tokoname (JP); DENSO CORPORATION, Kariya (JP)

( * ) Notice: Subject to any disclaimer, the term of this patent is extended or adjusted under 35 U.S.C. 154(b) by 940 days.

(21) Appl. No.: 16/967,040

(22) PCT Filed: Feb. 1, 2019

(86) PCT No.: PCT/JP2019/003547  
§ 371 (c)(1),  
(2) Date: Aug. 3, 2020

(87) PCT Pub. No.: WO2019/155986  
PCT Pub. Date: Aug. 15, 2019

(65) Prior Publication Data  
US 2021/0039216 A1 Feb. 11, 2021

(30) Foreign Application Priority Data  
Feb. 6, 2018 (JP) .................................. 2018-019525

(51) Int. Cl.  
*B23Q 15/12* (2006.01)  
*B23Q 17/09* (2006.01)  
*G05B 19/416* (2006.01)

(52) U.S. Cl.  
CPC ......... *B23Q 15/12* (2013.01); *B23Q 17/0976* (2013.01); *G05B 19/4163* (2013.01); *G05B 2219/49077* (2013.01)

(58) Field of Classification Search  
CPC ........ B23Q 15/02; B23Q 15/18; B23Q 15/12; B23Q 17/0976; B23C 3/00; B23D 3/00;  
(Continued)

(56) References Cited

U.S. PATENT DOCUMENTS 3,744,353 A    7/1973  Rohs  
5,431,514 A *  7/1995  Saito .................... B23Q 1/4876  
                                                    409/199

(Continued)

FOREIGN PATENT DOCUMENTS

CN    102029546 A    4/2011  
CN    102554685 A    7/2012

(Continued)

OTHER PUBLICATIONS

Office Action dated Feb. 9, 2021 in JP Application No. 2018-019525, 5 pages.

(Continued)

*Primary Examiner* — Sara Addisu  
(74) *Attorney, Agent, or Firm* — Muncy, Geissler, Olds & Lowe, P.C.

(57) ABSTRACT

A rotation controller controls a rotation mechanism for rotation of a spindle. A movement controller causes, while the spindle is rotating, a feed mechanism to bring a cutting tool into contact with a workpiece to cause the cutting tool to cut the workpiece. The rotation controller controls a (Continued)

spindle rotation speed so as to accelerate or decelerate the rotation of the spindle, and the movement controller brings the cutting tool into contact with the workpiece after the rotation controller starts the rotation of the spindle, and separates the cutting tool from the workpiece while the spindle rotation speed is put under the acceleration control or deceleration control exercised by the rotation controller.

5 Claims, 3 Drawing Sheets

(58) Field of Classification Search
CPC ............. B23D 13/00; G05B 19/4163; G05B 2219/49077; G05B 2219/43006
See application file for complete search history.

(56) References Cited

U.S. PATENT DOCUMENTS

| | | | | |
|---|---|---|---|---|
| 6,111,382 A * | 8/2000 | Tsutsui | ............... | G05B 19/186 |
| | | | | 470/96 |
| 6,252,367 B1 * | 6/2001 | Sakamoto | ............. | G05B 19/39 |
| | | | | 318/560 |
| 6,453,782 B1 * | 9/2002 | Yamazaki | ............. | G05B 19/186 |
| | | | | 82/121 |
| 10,118,232 B2 * | 11/2018 | Zhang | .................. | B24B 1/04 |
| 10,322,482 B2 * | 6/2019 | Morita | .................... | B23Q 5/10 |
| 2004/0003690 A1 * | 1/2004 | Katoh | ................. | B23Q 16/102 |
| | | | | 82/121 |
| 2006/0051167 A1 * | 3/2006 | Massa | .................. | B23B 27/164 |
| | | | | 407/103 |
| 2015/0160643 A1 | 6/2015 | Fujimoto | | |
| 2018/0117724 A1 * | 5/2018 | Morita | .................. | B23Q 15/02 |
| 2019/0091778 A1 * | 3/2019 | Hayasaka | ............. | B23Q 15/12 |
| 2021/0039175 A1 * | 2/2021 | Shamoto | ................ | B23B 51/02 |
| 2022/0402085 A1 * | 12/2022 | Shamoto | ............... | B23Q 15/02 |

FOREIGN PATENT DOCUMENTS

| | | |
|---|---|---|
| CN | 103769945 A | 5/2014 |
| CN | 105739438 A | 7/2016 |
| DE | 2042138 | 3/1972 |
| DE | 112017005223 T5 | 7/2019 |
| DE | 112019003996 T5 | 4/2021 |
| JP | S49105277 | 4/1974 |
| JP | 2005144580 A | 6/2005 |
| JP | 2005144580 A | 6/2005 |
| JP | 2016163918 A | 9/2016 |
| JP | 2018062056 A | 4/2018 |
| WO | WO-2018070403 A1 | 4/2018 |

OTHER PUBLICATIONS

German Office Action issued for corresponding German Patent Application No. 112019000681.9, dated May 23, 2023, 8 pages.
Office Action (with English translation) corresponding to Chinese application No. 201980009567.6 dated Jun. 3, 2021. (pp. 15).
Wang Jianjun et al.; "Machine Tool Dynamics", pp. 314-317, China University of Mining and Technology Press, Jul. 1993. (pp. 7).
An International Preliminary Report on Patentability dated Aug. 11, 2020 in PCT/JP2019/003547 (14 pages).

* cited by examiner

PROCESSING DEVICE AND CUT-PROCESSING METHOD

CROSS REFERENCE TO RELATED APPLICATIONS

This application is based upon and claims the benefit of priority from Japanese Patent Application No. 2018-19525, filed on Feb. 6, 2018, the entire contents of which are incorporated herein by reference.

TECHNICAL FIELD

The present disclosure relates to a machining apparatus and a cutting method.

BACKGROUND ART

Conventional machine tools structured to bring a cutting tool into contact with a workpiece (to-be-cut object) while rotating a rotatable spindle together with the cutting tool or the workpiece with the cutting tool or workpiece supported by the spindle to cut the workpiece have been used. When a cutting width is unnecessarily increased in such a machine tool, "regenerative chatter vibration" that are vibrations of the workpiece and/or the cutting tool during cutting work may occur.

"Regenerative chatter vibration" is self-excited vibration in which the vibration that occurred during cutting one rotation before (one blade before with a multi-edged tool) remains as an undulation on a machined surface and the cutting thickness fluctuates during the current cutting by the regeneration of the vibration. This forms a closed loop in which a change in cutting force generates vibrations again, and when the loop gain becomes larger, the vibrations grow and become large chatter vibrations. "Regenerative chatter vibration" may become a factor to not only deteriorate finishing accuracy of a machined surface, but also chip the cutting tool. Patent document 1 discloses a method for suppressing, when turning work is applied to a workpiece, "chatter vibration" by changing a rotation speed of a spindle at short intervals with a feed rate of a cutting tool kept constant.

CITATION LIST

Patent Document

[patent document 1] JP S49-105277 A

SUMMARY OF THE INVENTION

Problem to be Solved by the Invention

In the turning work, the rotation speed of the spindle, that is, the cutting speed is changed so as to make the current cutting speed different, to a sufficient degree, from a speed one rotation before at a certain rotation position, thereby suppressing growth of regenerative chatter vibrations. However, as disclosed in patent document 1, when the rotation speed of the spindle is periodically changed, a ratio between the current speed and the speed one rotation before becomes close to 1 before and after a switch between an increase and decrease in the rotation speed. For example, when the rotation speed of the spindle is periodically changed in a sinusoidal manner, the ratio between the current speed and the speed one rotation before becomes approximately 1 before and after the rotation speed reaches a maximum value and minimum value, and thus the effect of suppressing regenerative chatter vibrations becomes small.

The present disclosure has been made in view of such circumstances, and it is therefore an object of the present disclosure to provide a cutting technique for suppressing regenerative chatter vibrations.

Means to Solve the Problem

In order to solve the above-described problems, a machining apparatus according to one aspect of the present disclosure includes a rotation mechanism structured to rotate a spindle to which a cutting tool or workpiece is attached, a rotation controller structured to control the rotation mechanism for rotation of the spindle, a feed mechanism structured to move the cutting tool relative to the workpiece, and a movement controller structured to cause, while the spindle is rotating, the feed mechanism to bring the cutting tool into contact with the workpiece to cause the cutting tool to cut the workpiece. The rotation controller has a function of exercising (conducting or performing) acceleration control under which the rotation of the spindle is kept accelerated or deceleration control under which the rotation of the spindle is kept decelerated. The movement controller brings the cutting tool into contact with the workpiece after the rotation controller starts the rotation of the spindle, and separates the cutting tool from the workpiece while a rotation speed of the spindle is put under the acceleration control or deceleration control exercised by the rotation controller.

Another aspect of the present disclosure is a cutting method. This method includes a rotation control step of controlling rotation of a spindle to which a cutting tool or workpiece is attached, and a machining step of bringing, while the spindle is rotating, the cutting tool into contact with the workpiece to cause the cutting tool to cut the workpiece. The rotation control step includes a step of exercising acceleration control under which the rotation of the spindle is kept accelerated or deceleration control under which the rotation of the spindle is kept decelerated, and the machining step includes a step of bringing the cutting tool into contact with the workpiece after start of the rotation of the spindle, and separating the cutting tool from the workpiece while a rotation speed of the spindle is put under the acceleration control or the deceleration control.

Note that any combination of the above-described components, or an entity that results from replacing expressions of the present disclosure among a method, an apparatus, a system, and the like is also valid as an aspect of the present disclosure.

MODE FOR CARRYING OUT THE INVENTION

Figure 1:
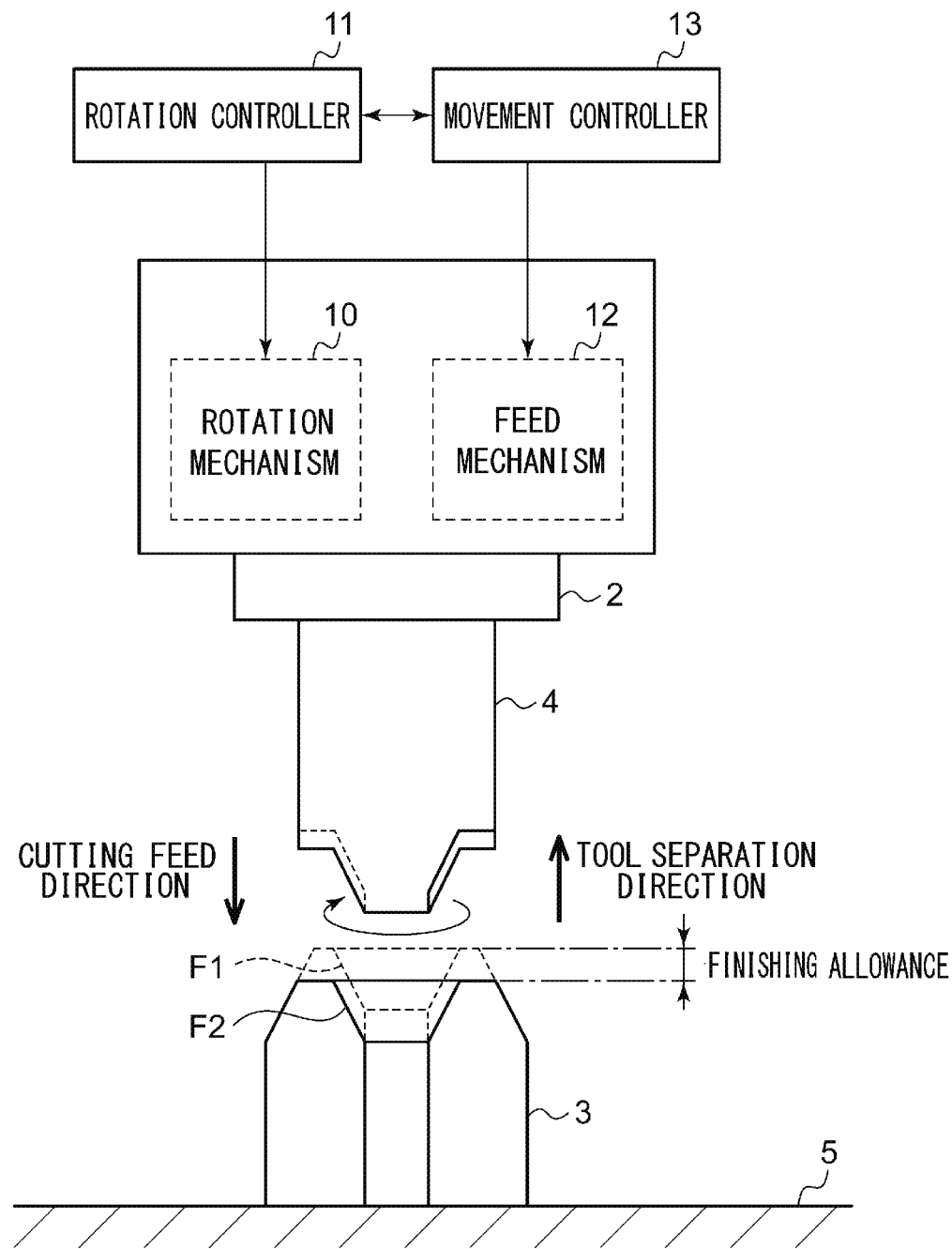
FIG. 1 is a diagram showing a structure of a machining apparatus according to an embodiment.

FIG. 1 shows a structure of a machining apparatus 1 according to an embodiment. The machining apparatus 1 includes a rotation mechanism 10 that rotates a spindle 2 to which a cutting tool 4 is attached, a rotation controller 11 that controls the rotation mechanism 10 for rotation of the spindle 2, a feed mechanism 12 that moves the cutting tool 4 relative to a workpiece 3, and a movement controller 13 that causes, while the spindle 2 is rotating, the feed mechanism 12 to bring the cutting tool 4 into contact with the workpiece 3 to cause the cutting tool 4 to cut the workpiece 3. The machining apparatus 1 may be a numerical control (NC) machine tool. The rotation mechanism 10 and the feed mechanism 12 each include a drive unit such as a motor, and the rotation controller 11 and the movement controller 13 each adjust power to be supplied to a corresponding drive unit to control behavior of a corresponding one of the rotation mechanism 10 and the feed mechanism 12.

Figure 3:
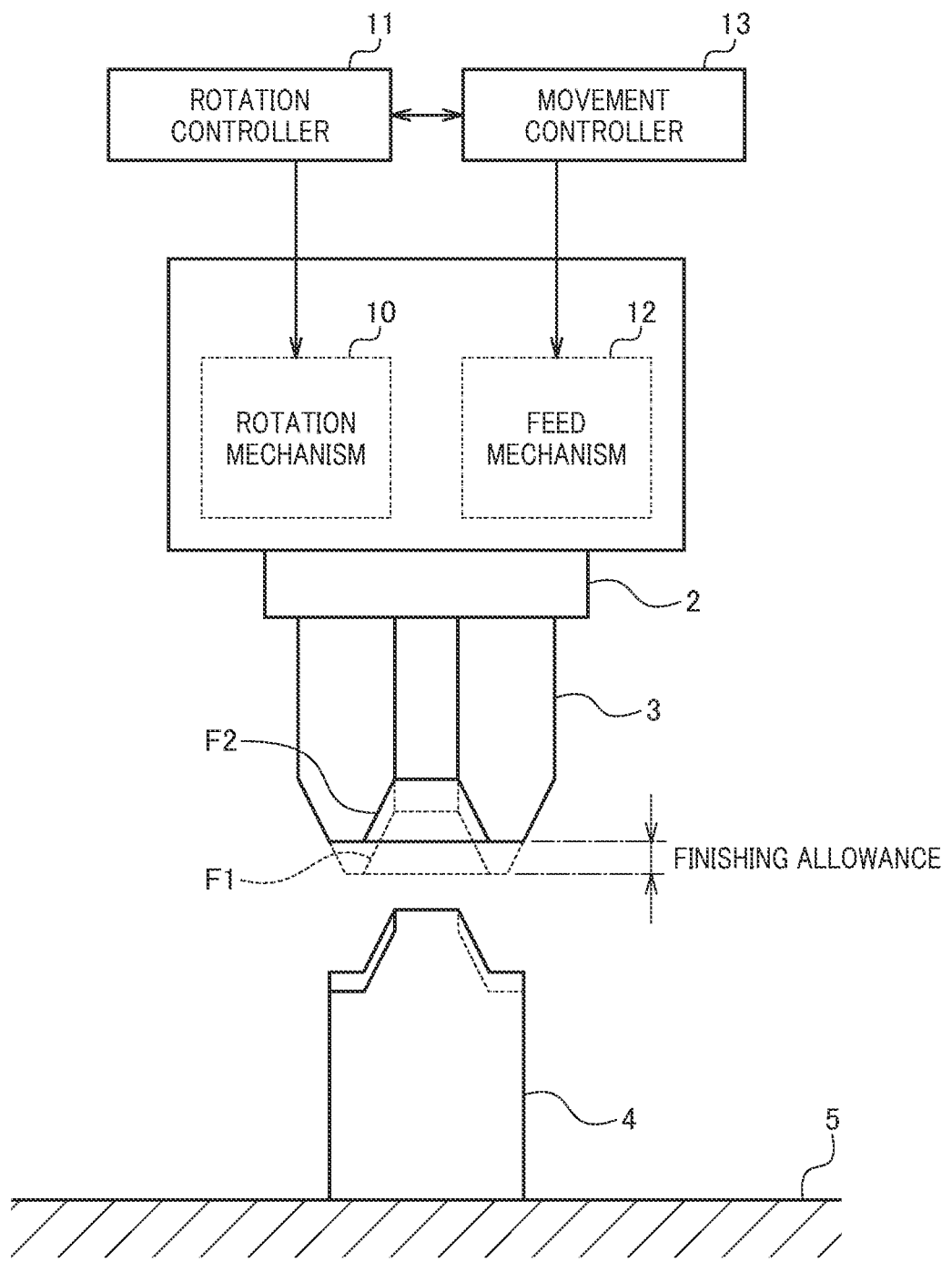
FIG. 3 is a diagram showing a structure of a machining apparatus according to another embodiment.

Note that, according to the embodiment, the cutting tool 4 is attached to the spindle 2, and the workpiece 3 is held by a fixing table 5, but the workpiece 3 may be attached to the spindle 2, as shown in FIG. 3, and rotated by the rotation mechanism 10. Further, the feed mechanism 12 only needs to move the cutting tool 4 relative to the workpiece 3 and is structured to move at least either the cutting tool 4 or the workpiece 3.

FIG. 1 shows a cross section of the workpiece 3 for describing a cutting process in which a sealing surface is machined on the workpiece 3. Before the machining of the sealing surface, the workpiece 3 has a to-be-machined surface F1 represented by a dotted line. In the machining of the sealing surface, the movement controller 13 start to cut the to-be-machined surface F1 by moving the cutting tool 4 in a cutting feed direction, and separates, after cutting to a finished surface F2 represented by a solid line, the cutting tool 4 from the workpiece 3. This cutting corresponds to parting finishing work, and as shown in FIG. 1, the movement controller 13 controls the feed mechanism 12 to cut the workpiece 3 by a predetermined finishing allowance. The movement controller 13 accurately manages a cutting end target position at which the cutting tool 4 reaches the finished surface F2, and separates the cutting tool 4 from the workpiece 3 at timing when the cutting tool 4 has finished cutting the finished surface F2. This finishing work is cutting of an end face with a relatively large cutting width, and thus causes chatter vibrations but makes a cutting time shorter.

In the machining apparatus 1 according to the embodiment, the rotation controller 11 has a function of exercising acceleration control under which the rotation of the spindle 2 is kept accelerated, and, while the rotation speed of the spindle is put under the acceleration control exercised by the rotation controller 11, the movement controller 13 controls the feed mechanism 12 to cause the cutting tool 4 to cut the workpiece 3 from the to-be-machined surface F1 to the finished surface F2 of the workpiece 3. The machining apparatus 1 makes it possible to suppress the occurrence of regenerative chatter vibrations by completing the cutting process while the rotation of the spindle 2 is kept accelerated.

According to the embodiment, control for changing the speed so as to make a ratio (speed variation ratio) between the current speed at a certain rotation position and a speed at the same rotation position but one rotation before greater than 1 is defined as acceleration control of the rotation of the spindle at the rotation position. The rotation controller 11 has a function of exercising the acceleration control so as to make the speed variation ratio greater than 1 at all rotation positions about a rotation axis of the spindle. Therefore, while the rotation speed of the spindle is put under the acceleration control exercised by the rotation controller 11, the current speed becomes higher than the speed one rotation before at all the rotation positions, which makes it possible to suppress the occurrence of regenerative chatter vibrations.

Note that, under the acceleration control, the speed only needs to be changed such that the current speed becomes higher than the speed one rotation before at all rotation positions, and a relationship between high and low levels of changes in speed within one rotation is not limited to a particular relationship.

Note that the rotation controller 11 has a function of exercising deceleration control under which the rotation of the spindle 2 is kept decelerated, and, while the rotation speed of the spindle is put under the deceleration control exercised by the rotation controller 11, the movement controller 13 may control the feed mechanism 12 to cause the cutting tool 4 to cut the workpiece 3 from the to-be-machined surface F1 to the finished surface F2 of the workpiece 3. Also, in this case, it is possible to suppress the occurrence of regenerative chatter vibrations by completing the cutting process while the rotation of the spindle 2 is kept decelerated.

The deceleration control is defined as control under which the speed is change so as to make the speed variation ratio smaller than 1. The rotation controller 11 has a function of exercising the deceleration control so as to make the speed variation ratio smaller than 1 at all rotation positions about the rotation axis of the spindle. Therefore, while the rotation speed of the spindle is put under the deceleration control exercised by the rotation controller 11, the current speed becomes lower than the speed one rotation before at all rotation positions, which makes it possible to suppress the occurrence of regenerative chatter vibrations. Under the deceleration control, the speed only needs to be changed such that the current speed becomes lower than the speed one rotation before at all rotation positions, and a relationship between high and low levels of changes in speed within one rotation is not limited to a particular relationship.

As described above, the machining apparatus 1 applies the parting finishing work while the rotation speed of the spindle is put under the acceleration control or deceleration control exercised by the rotation controller 11 thereby suppressing the occurrence of regenerative chatter vibrations. While the cutting tool 4 is cutting the workpiece 3 from the to-be-machined surface F1 to the finished surface F2, the acceleration control or deceleration control continuously exercised by the rotation controller 11 suppresses the occurrence of chatter vibrations at all times. This makes it possible to suppress tool wear or achieve machining with excellent finishing accuracy when the finished surface always remains.

When attention is paid to the finishing accuracy, it reveals that the acceleration control or deceleration control only needs to be exercised at least at timing immediately before the cutting tool 4 is separated from the workpiece 3. Here, what has the greatest effect on the finishing accuracy is machining equivalent to two rotations immediately before the separation. Therefore, while the spindle 2 is rotated at least two rotations under the acceleration control or deceleration control exercised by the rotation controller 11, the movement controller 13 separates the cutting tool 4 from the workpiece 3, which achieves machining with excellent finishing accuracy.

Figure 2A:
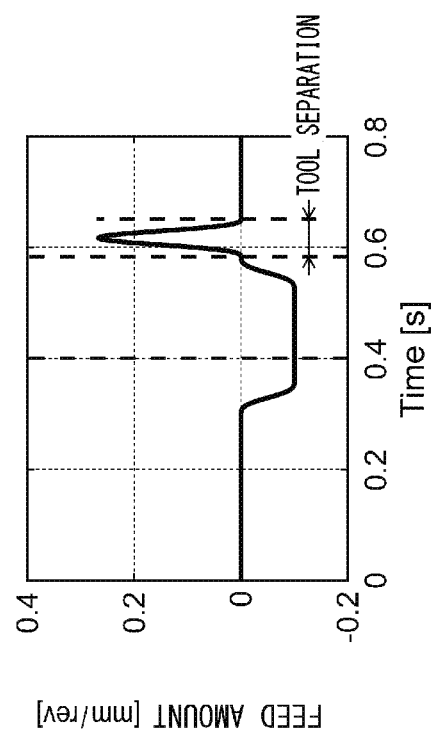
FIGS. 2(a) to 2(d) are diagrams for describing finishing work according to the embodiment.
Figure 2B:
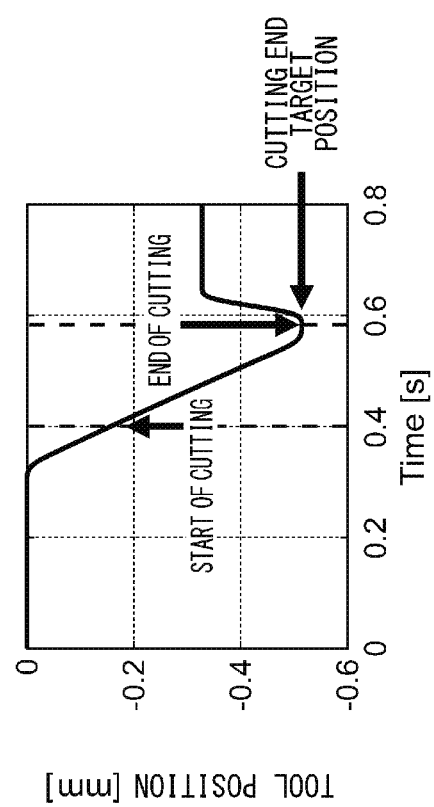
Figure 2C:
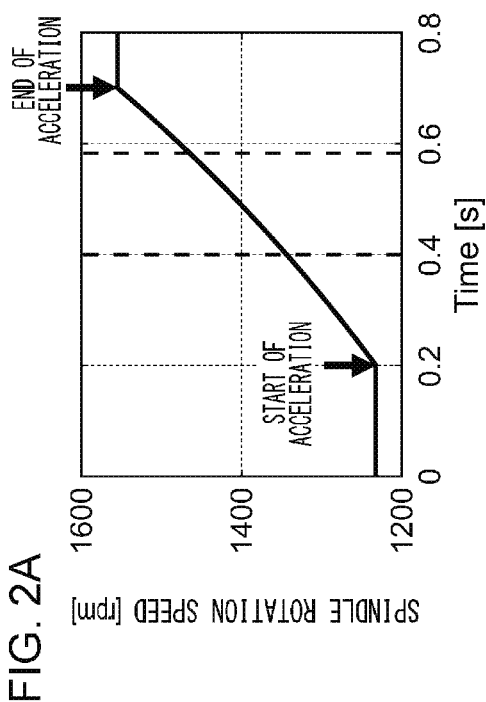
Figure 2D:
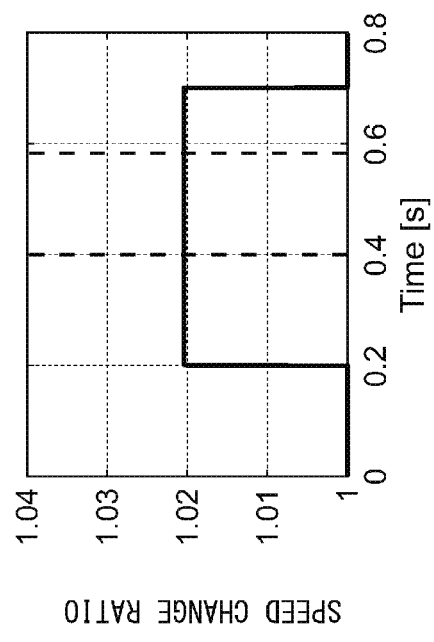

FIGS. 2(a) to 2(d) are diagrams for describing the finishing work according to the embodiment. FIG. 2(a) shows time-series changes in spindle rotation speed, FIG. 2(b) shows time-series changes in speed variation ratio, FIG. 2(c) shows time-series changes in feed amount, and FIG. 2(d) shows time-series changes in tool position.

In this finishing work, first, the rotation controller 11 controls the rotation mechanism 10 to rotate the spindle 2 at a predetermined rotation speed. The tool position at this time is defined as an initial position (position in a vertical direction=0 mm). The rotation controller 11 starts the acceleration control of the rotation of the spindle 2 after 0.2 seconds. The rotation controller 11 according to the embodiment accelerates the rotation speed of the spindle 2 at a constant speed variation ratio (1.02) for 0.5 seconds after the start of the acceleration control of the rotation. According to the embodiment, the speed variation ratio is a speed ratio between the current speed and the speed at the same rotation position but one rotation before; therefore, when the speed variation ratio is made greater than 1, the current speed becomes higher than the speed one rotation before at all rotation positions under the acceleration control. It is preferable that the speed variation ratio be made equal to or greater than a value that can suppress the occurrence of chatter vibrations. Note that the rotation controller 11 may exercise change control under which the speed variation ratio is changed with time.

The movement controller 13 brings the cutting tool 4 into contact with the workpiece 3 after the rotation controller 11 starts the rotation of the spindle 2. In this example, as shown in FIGS. 2(c) and 2(d), after the start of the acceleration control of the rotation, the movement controller 13 starts to feed and moves the cutting tool 4 toward the workpiece 3 to bring the cutting tool 4 into contact with the workpiece 3. For example, the movement controller 13 may receive notification of timing at which the rotation controller 11 starts to change the rotation speed of the spindle, and control the feed mechanism 12 to bring the cutting tool 4 into contact with the workpiece 3 after the timing at which the rotation controller 11 starts to change the rotation speed of the spindle.

The movement controller 13 according to the embodiment is notified from the rotation controller 11 of the timing at which the change of the rotation speed of the spindle is started. The rotation controller 11 may notify, when the change of the rotation speed has been started (that is, after 0.2 seconds), the movement controller 13 that the rotation controller 11 has started to change the rotation speed, or alternatively, may notify the movement controller 13 of the timing at which the change of the rotation speed is started before the change of the rotation speed is actually started. In any case, the movement controller 13 is notified from the rotation controller 11 of the timing at which the change of the rotation speed of the spindle 2 is started, and controls the feed mechanism 12 to bring the cutting tool 4 into contact with the workpiece 3 after the timing at which the change of the rotation speed is started. In the example shown in FIG. 2, the movement controller 13 moves the cutting tool 4 at a constant feed amount or feed rate after the start of the change of the rotation speed.

The movement controller 13 separates the cutting tool 4 from the workpiece 3 while the rotation speed of the spindle is put under the acceleration control exercised by the rotation controller 11. Herein, the movement controller 13 determines the end of cutting when the tool position reaches −0.5 mm, and moves the cutting tool 4 in a direction away from the workpiece 3. The movement controller 13 reduces and inverts the feed rate to separate the cutting tool 4 from the workpiece 3, thereby bringing the finishing work to an end.

As described above, when a time from start to end of the change of the rotation speed of the spindle is referred to as a change time, and a time from start to end of cutting by the cutting tool 4 is referred to as a cutting time, the rotation controller 11 and the movement controller 13 control the rotation of the spindle 2 and the feed of the cutting tool 4, respectively so as to satisfy change time>cutting time. The movement controller 13 starts feed control of the cutting tool 4 by using the timing at which the change of the rotation speed is started such that the cutting time falls within the change time. This allows the machining apparatus 1 according to the embodiment to suppress the occurrence of regenerative chatter vibrations.

The present disclosure has been described based on the examples. It is to be understood by those skilled in the art that the examples are illustrative and that various modifications are possible for a combination of components or processes, and that such modifications are also within the scope of the present disclosure. In the timing chart shown in FIG. 2, the movement controller 13 starts to feed the cutting tool 4 to bring the cutting tool 4 into contact with the workpiece 3 in 0.4 seconds after the start of the acceleration control of the rotation, but the movement controller 13 may bring the cutting tool 4 into contact with the workpiece 3 before the start of the change of the rotation speed of the spindle, that is, before the elapse of 0.2 seconds. Even in this case, the movement controller 13 exercises the feed control of the cutting tool 4 to make a cutting end time earlier than a change end time to bring the cutting process to an end while the rotation of the spindle 2 is kept accelerated, which achieves machining with excellent finishing accuracy.

An outline of aspects of the present disclosure is as follows. A machining apparatus according to one aspect of the present disclosure includes a rotation mechanism structured to rotate a spindle to which a cutting tool or workpiece is attached, a rotation controller structured to control the rotation mechanism for rotation of the spindle, a feed mechanism structured to move the cutting tool relative to the workpiece, and a movement controller structured to cause, while the spindle is rotating, the feed mechanism to bring the cutting tool into contact with the workpiece to cause the cutting tool to cut the workpiece. The rotation controller has a function of exercising acceleration control under which the rotation of the spindle is kept accelerated or deceleration control under which the rotation of the spindle is kept decelerated. The movement controller brings the cutting tool into contact with the workpiece after the rotation controller starts the rotation of the spindle, and controls the feed mechanism to separate the cutting tool from the workpiece while a rotation speed of the spindle is put under the acceleration control or deceleration control exercised by the rotation controller.

According to this aspect, since the movement controller terminates the cutting process made by the cutting tool while the rotation speed of the spindle is changing in an acceleration direction or deceleration direction, it is possible to effectively suppress the occurrence of regenerative chatter vibrations.

It is preferable that when the rotation controller has rotated the spindle at least two rotations under the acceleration control or the deceleration control, the movement controller separate the cutting tool from the workpiece. The movement controller may bring the cutting tool into contact with the workpiece after the rotation controller starts to change the rotation speed of the spindle, and separate the cutting tool from the workpiece before the rotation controller stops changing the rotation speed of the spindle. Note that the movement controller may receive notification of timing at which the rotation controller starts to change the rotation speed of the spindle, and control the feed mechanism to bring the cutting tool into contact with the workpiece after the timing at which the rotation controller starts to change the rotation speed of the spindle.

A cutting method according to another aspect of the present disclosure includes a rotation control step of controlling a rotation speed of a spindle to which a cutting tool or workpiece is attached, and a machining step of bringing, while the spindle is rotating, the cutting tool into contact with the workpiece to cause the cutting tool to cut the workpiece. The rotation control step includes a step of exercising acceleration control under which the rotation of the spindle is kept accelerated or deceleration control under which the rotation of the spindle is kept decelerated, and the machining step includes a step of bringing the cutting tool into contact with the workpiece after start of the rotation of the spindle, and separating the cutting tool from the workpiece while a rotation speed of the spindle is put under the acceleration control or the deceleration control.

DESCRIPTION OF THE REFERENCE NUMERALS 1 machining apparatus, 2 spindle, 3 workpiece, 4 cutting tool, 5 fixing table, 10 rotation mechanism, 11 rotation controller, 12 feed mechanism, 13 movement controller

INDUSTRIAL APPLICABILITY

The present disclosure is applicable to cutting techniques.

The invention claimed is:

1. A machining apparatus comprising:
a rotation mechanism configured to rotate a spindle to which a cutting tool or workpiece is attached;
a rotation controller configured to control the rotation mechanism for rotation of the spindle;
a feed mechanism configured to move the cutting tool relative to the workpiece; and
a movement controller configured to control the feed mechanism to bring the cutting tool into contact with the workpiece, while the spindle is rotating, to cause the cutting tool to cut the workpiece, wherein
the rotation controller performing an acceleration control mode under which the rotation of the spindle is kept accelerated or a deceleration control mode under which the rotation of the spindle is kept decelerated, and
the movement controller brings the cutting tool into contact with the workpiece after the rotation controller starts the rotation of the spindle, and separates the cutting tool from the workpiece while a rotation speed of the spindle is put under the acceleration control mode or deceleration control mode performed by the rotation controller.

2. The machining apparatus according to claim 1, wherein when the rotation controller has rotated the spindle at least two rotations under the acceleration control mode or the deceleration control mode, the movement controller separates the cutting tool from the workpiece.

3. The machining apparatus according to claim 1, wherein the movement controller brings the cutting tool into contact with the workpiece after the rotation controller starts to change the rotation speed of the spindle, and separates the cutting tool from the workpiece before the rotation controller stops changing the rotation speed of the spindle.

4. The machining apparatus according to claim 3, wherein the movement controller receives notification of timing at which the rotation controller starts to change the rotation speed of the spindle, and controls the feed mechanism to bring the cutting tool into contact with the workpiece after the timing at which the rotation controller starts to change the rotation speed of the spindle.

5. A cutting method comprising:
a rotation control step of controlling rotation of a spindle to which a cutting tool or workpiece is attached; and
a machining step of bringing, while the spindle is rotating, the cutting tool into contact with the workpiece to cause the cutting tool to cut the workpiece, wherein
the rotation control step includes performing an acceleration control mode under which the rotation of the spindle is kept accelerated or a deceleration control mode under which the rotation of the spindle is kept decelerated, and
the machining step includes bringing the cutting tool into contact with the workpiece after start of the rotation of the spindle, and separating the cutting tool from the workpiece while a rotation speed of the spindle is put under the acceleration control mode or the deceleration control mode.

* * * * *